Jan. 4, 1949.        W. M. NAGLE        2,458,404
MANUFACTURE OF SODIUM HYDROXYLAMINE SULFONATES
Filed June 5, 1945
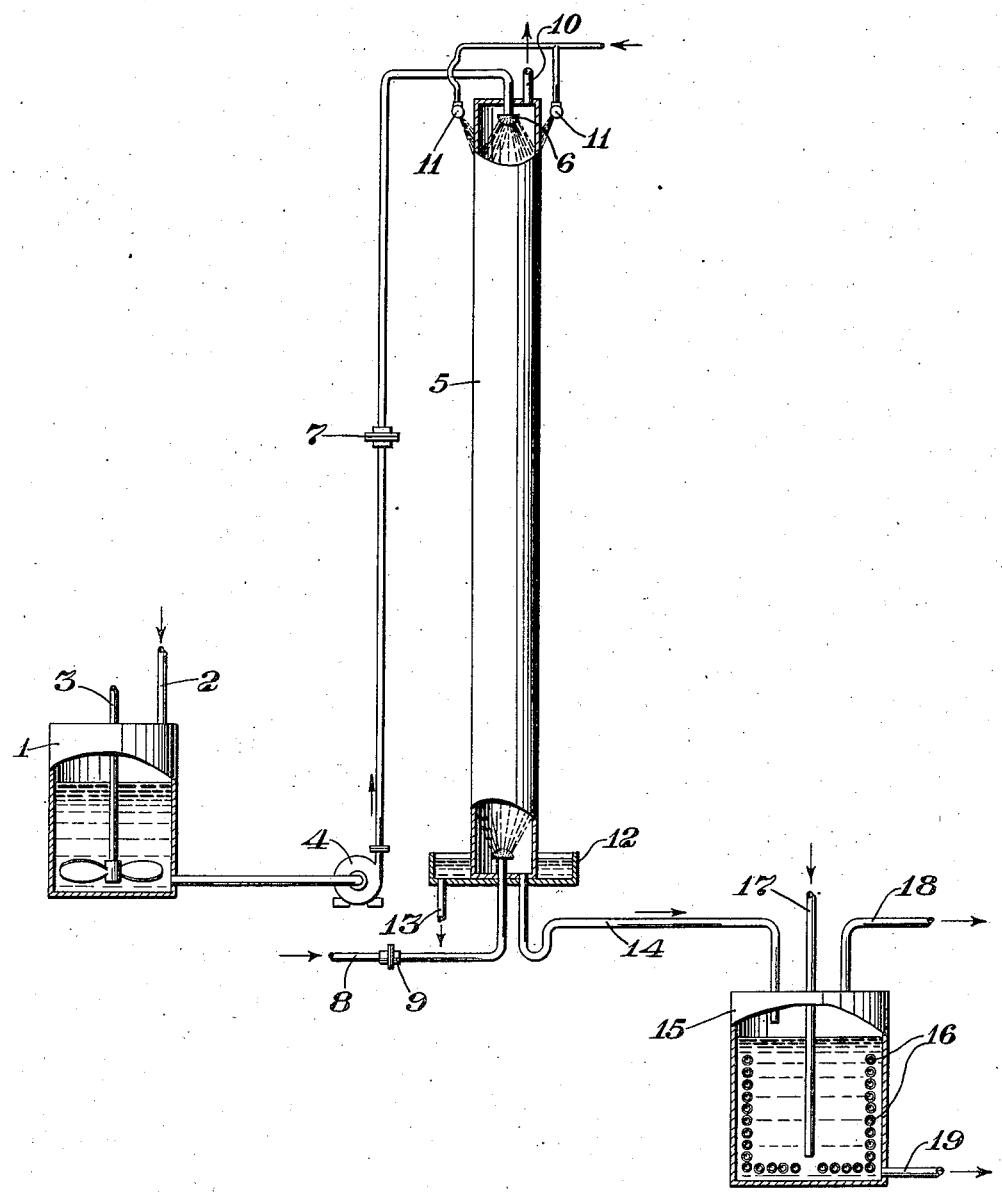
W. M. Nagle   INVENTOR.
BY Thos. A. Wilson
ATTORNEY Patented Jan. 4, 1949

2,458,404

UNITED STATES PATENT OFFICE 2,458,404

MANUFACTURE OF SODIUM HYDROXYL-AMINE SULFONATES

Wesley Michael Nagle, Woodbury, N. J., assignor to E. I. du Pont de Nemours & Company, Wilmington, Del., a corporation of Delaware Application June 5, 1945, Serial No. 597,659

5 Claims. (Cl. 23—114)

This invention relates to an improved process for the manufacture of salts of hydroxylamine sulfonic acids.

Methods have been disclosed heretofore for the preparation of sodium hydroxylamine disulfonate, particularly by the Raschig procedure, which is described in Organic Syntheses, vol 3, p. 61, and in a number of other publications. Raschig's process comprises reacting sodium nitrite and sodium acid sulfite in aqueous solution at a temperature of around 0° C., sulfur dioxide being passed into the solution of the reactants until an acid reaction to the proper test papers is obtained. The existence of very low temperatures of the order indicated has been considered necessary if hydroxylamine salts in any satisfactory yield are to be prepared. This made the use of refrigeration essential, which was undesirable from the viewpoint of expense, complexity of apparatus and increased labor requirements.

An object of the present invention is an improved method for the preparation of salts of hydroxylamine sulfonic acids whereby the reaction takes place efficiently at normal or elevated temperatures. A further object is such a method in which the necessity for refrigeration is avoided and the process is carried out in much shorter time than previously. Additional objects will be disclosed as the invention is described more in detail hereinafter.

I have found that the foregoing objects are accomplished, and many of the disadvantages and complications of the prior art methods overcome, when I prepare salts of the hydroxylamine sulfonic acids by reacting an inorganic nitrite with an acid sulfite in aqueous solution and introducing sulfur dioxide into the reaction mixture, while maintaining the temperature of the reactants between 10° C. and the decomposition temperature of the sulfonates formed, desirably between 10° and 75° C., allowing very brief time of contact between the sulfur dioxide and the other reactants. A suitable and efficient procedure for ensuring the proper contact conditions has been found to comprise continuously passing an aqueous solution containing equimolar quantities of the nitrite and the acid sulfite countercurrent to a flow of gaseous sulfur dioxide, whereby the hydroxylamine sulfonates formed pass through the reaction zone rapidly and become removed from contact with the reactants.

The reactions taking place in the foregoing procedure are as follows:

$$NaNO_2 + NaHSO_3 \rightarrow NaOH + NOSO_3Na$$

$$NaOH + SO_2 \rightarrow NaHSO_3$$

$$NOSO_3Na + NaHSO_3 \rightarrow HON(SO_3Na)_2$$

It is apparent from the above that the sulfur dioxide functions to convert the sodium hydroxide, initially formed, to additional acid sulfite. The final product, sodium hydroxylamine disulfonate, tends to become hydrolyzed to the monosulfonate as the temperature increases, according to the following reaction:

$$HON(SO_3Na)_2 + H_2O \rightarrow HONHSO_3Na + NaHSO_4$$

Even at the temperatures of the present process, some monosulfonate may be formed. This is no drawback to the method, however, as in the uses for the disulfonate the first step ordinarily consists of conversion to the monosulfonate. The present invention, therefore, may be considered as a method for preparing either the disulfonate alone or a mixture of hydroxylamine sulfonates.

The following example is given as a specific embodiment of the manner of practicing the invention, which will be described by reference to the accompanying drawing:

Water in the amount of 922 pounds was run into vessel 1 through pipe 2, and 86 pounds of sodium nitrite and 129.5 pounds of sodium acid sulfite were introduced into the water and brought into solution. The solution was agitated by means of the paddle 3. The solution was raised by means of pump 4 to the top of a lead column 5, 6 inches in diameter by 6 feet length, and by means of distributor 6 was sprayed onto the walls of the column and caused to flow down over the inside surface of said walls in the form of a film. The rate of delivery of the solution to the column was measured by means of the orifice meter 7. Through pipe 8, substantially pure sulfur dioxide was caused to pass up through the column 5 countercurrent to the downflowing salt solution, the flow rate of the gas being measured at orifice meter 9, and to react with the dissolved salts, with formation of sodium hydroxylamine disulfonate, any excess of sulfur dioxide passing out through vent 10. With the amounts of sodium nitrite and acid sulfite used, a total amount of 82.8 pounds of sulfur dioxide was passed up the column. The rate of flow of gas was 74 pounds per hour, and of solution 935 pounds per hour, the time for the total amounts given being about 1 hour and 12 minutes. The inflowing solution at the top was at a temperature of about 27° C. and attained a maximum of 53° C. during its downward flow, leaving at a temperature of 47° C. The column was cooled during the reaction by film of water flowing down the outside, distributed over the surface by the sprays 11. The lead column rested at the bottom on the receptacle 12, from which the collected cooling water flowed out through pipe 13. The liquid reaction product from the bottom of the column flowed through pipe 14 into vessel 15. This receiving vessel contained cooling coils 16, and an air agitator 17, and had a fume vent 18 and a liquid outlet 19. The liquid product showed on analysis a content of 3.05%, calculated as hydroxylamine, an over-all yield of 90.4%, based on sodium nitrite.

A distinguishing feature of the present invention is the employment of a reaction temperature not lower than 10° C. but below the decomposition temperature of the hydroxylamine sulfonates, desirably between 10° and 75° C. All previous investigators have found it necessary to maintain the temperature at around 0° C. or lower, in order to avoid undesirable side reactions that at least greatly reduce the yield of the desired product, if not eliminating it completely. The present process overcomes this adverse effect by maintaining a very brief contact period between the sulfur dioxide and the other reactants. It will be understood that the proportions of ingredients used should be kept within closely controlled limits.

The continuous process of the present invention may bring about this brief contact by various procedures. According to the specific example cited and illustrated in the attached drawing, the inorganic salts are caused to flow in the form of a film of solution down over the inner surface of a column of suitable material, while sulfur dioxide gas passes up and counter-current thereto, the contact time being very brief, for example of the order of 2 to 10 seconds. Lead has been found to be suitable for column material but the invention is not limited to the use of this metal, as the column may be of aluminum, copper, glass, etc., any material in fact suitably resistant to corrosion. Another procedure would be to pass the sulfur dioxide upward through a suitably cooled packed tower of any type counter to the downflowing solution. The important consideration is that the sulfur dioxide be present continuously in sufficient amount to react with the sodium hydroxide formed, while avoiding a final excess of either sulfur dioxide or other reactant.

Various inorganic nitrites other than the sodium salt may be used, for example potassium nitrite, calcium and magnesium nitrites, etc. Likewise any water-soluble acid sulfite is applicable. In mixing the reactants, a common solution may be made up of sodium nitrite and sodium acid sulfite, and utilized as needed. I may find it advantageous to prepare separate solutions of the two salts and mix shortly before using, or the solutions may be introduced separately into the reaction chamber in measured proportions and mixed therein.

In carrying out the process, sulfur dixode in substantially pure form may be used, such as is available commercially in cylinders. I may, however, find it economically desirable to employ sulfur dioxide diluted with various nonreacting gases. Gases obtained by the combustion of sulfur in ordinary sulfur burners are very suitable for use. It will be understood that the process may be carried out at atmospheric or superatmospheric pressure, as desired. With the use of burner gas, the use of elevated pressure will be particularly desirable to increase the partial pressure of said sulfur dioxide which ordinarily is present in amounts of around 10% in such gas.

The salts of the hydroxylamine sulfonic acids are important reagents in a number of commercial processes, as in the oximation of various ketones and in many other reactions where hydroxylamine salts are desired. In oximation reactions, the disulfonate first formed is ordinarily hydrolyzed in a second step to the monosulfonate, hence there is no disadvantage if some or all of the hydrolysis takes place during the initial stage, as will frequently be the case in the process described. It will be readily realized that the avoiding of the necessity for refrigeration in my process eliminates a complicated and expensive apparatus requirement, so that a definite advance in the art is accomplished.

The invention has been disclosed adequately in the foregoing. It will be understood, however, that many variations in details of procedure, ingredient proportions, and conditions of reaction may be introduced, without departure from the scope of the invention. I intend to be limited only by the following claims:

I claim:

1. A process for preparing sodium salts of hydroxylamine sulfonic acids which comprise contacting an aqueous solution containing substantially equimolar proportions of sodium nitrite and sodium acid sulfite with gaseous sulfur dioxide at a temperature between 10° and 75° C., any collected mass of solution being of such film thinness and in continuous contact with sulfur dioxide that the reaction with substantially complete conversion to the said sulfonic acid salt is completed within a period not exceeding 10 seconds, and maintaining that portion away from admixture with solution containing unreacted salts, whereby side reactions of the hydroxylamine sulfonates formed and the reactants are avoided.

2. The process of preparing sodium salts of hydroxylamine sulfonic acids, which comprises continuously flowing equimolar proportions of sodium nitrite and sodium acid sulfite in aqueous solution in a thin layer, continuously flowing countercurrent thereto gaseous sulfur dioxide, maintaining the reactants during the process at a temperature between 10° and 75° C., and maintaining the contact between each portion of the solution and the counter flowing gaseous sulfur dioxide for a period not exceeding 10 seconds.

3. The process of claim 2, in which the sulfur dioxide introduced is diluted with a predominate amount of non-reacting gases.

4. The process of claim 2, in which the flow of the aqueous solution is down.

5. The process of claim 2, in which the system is maintained under superatmospheric pressure during the reaction.

WESLEY MICHAEL NAGLE.

REFERENCES CITED

The following references are of record in the file of this patent:

UNITED STATES PATENTS

| Number | Name | Date |
| --- | --- | --- |
| 2,189,173 | Hebbard, et al. | Feb. 6, 1940 |
| 2,192,124 | Brill et al. | Feb. 27, 1940 |

OTHER REFERENCES

Raschig, Journal of the Chemical Society (London), vol. 54, page 913, (1888).

Divers, et al., Journal of the Chemical Society, (London), vol. 69, pages 1665-6 (1896).